United States Patent [19]

Negrin et al.

[11] Patent Number: 5,522,650
[45] Date of Patent: Jun. 4, 1996

[54] METHOD AND SYSTEM FOR CONTROLLABLY RESTRICTING THE ON TIME OF A VEHICULAR PUMP IN AN ELECTRO-HYDRAULIC CONTROL SYSTEM

[75] Inventors: Dan Negrin, Wiesbaden, Germany; Mark S. Luckevich; Brian C. Tuck, both of Ann Arbor, Mich.

[73] Assignee: Kelsey Hayes Company, Livonia, Mich.

[21] Appl. No.: 417,651

[22] Filed: Apr. 5, 1995

Related U.S. Application Data

[63] Continuation of Ser. No. 383,596, Feb. 3, 1995, abandoned.

[51] Int. Cl.$^6$ ..................................................... B60T 13/16
[52] U.S. Cl. ........................ 303/10; 303/116.1; 303/119.1
[58] Field of Search .................................. 303/10, 116.1, 303/113.1, 11, 115.1–115.2, 119.1; 364/424.05; 137/565

[56] References Cited

U.S. PATENT DOCUMENTS

| | | | |
|---|---|---|---|
| 4,892,364 | 1/1990 | Burgdorf | 303/116 |
| 5,113,345 | 5/1992 | Mine et al. | 364/424.05 |
| 5,388,894 | 2/1995 | Holland et al. | 303/116.1 X |

FOREIGN PATENT DOCUMENTS

| | | | |
|---|---|---|---|
| 4092754 | 3/1992 | Japan | 303/116.1 |
| 4123963 | 4/1992 | Japan | 303/116.1 |
| 9407717 | 4/1994 | WIPO | |

*Primary Examiner*—Robert J. Oberleitner
*Assistant Examiner*—Peter M. Poon
*Attorney, Agent, or Firm*—Brooks & Kushman

[57] ABSTRACT

The method and system for controllably restricting the on time of a pump of an electro-hydraulic control system for a hydraulic brake system by modeling the amount of hydraulic brake fluid in a low pressure accumulator (LPA) of the hydraulic brake system. Sensors sense wheel speed of their respective wheels of a vehicle. Control valves, including isolation and dump valves, together with the pump, vary the amount of brake fluid in the LPA. A control unit electrically coupled to the pump, the control valves and the wheel speed sensors, initially detects an electro-hydraulic control event based on the sensed wheel speeds and then activates the control valves and pump which vary the amount of brake fluid in the LPA. The control unit models the amount of brake fluid in the LPA during the activation and controls the state of the pump based on the modeled amount of brake fluid in the LPA. The modeled amount of brake fluid in the LPA consequently is based on the on time of the pump and the total on time of all of the dump valves in the electro-hydraulic control system.

20 Claims, 2 Drawing Sheets

METHOD AND SYSTEM FOR CONTROLLABLY RESTRICTING THE ON TIME OF A VEHICULAR PUMP IN AN ELECTRO-HYDRAULIC CONTROL SYSTEM

CROSS-REFERENCE TO RELATED APPLICATION

This application is a continuation of U.S. Ser. No. 08/383,596, filed on Feb. 3, 1995 now abandoned

TECHNICAL FIELD

The present invention relates to methods and systems for restricting the on time of a vehicular pump and, in particular, to methods and systems for controllably restricting the on time of a vehicular pump in an electro-hydraulic control system such as a vehicle ABS.

BACKGROUND ART

Automobile NVH (i.e., noise, vibration, and harshness) has gained interest recently with rising consumer expectations. In the past, engines, transmissions and tires were of the most concern to researchers, but as these became quieter, and with the advent of electric vehicles, other sources of NVH on a vehicle have become more significant.

In an effort to meet the increasing demands of vehicle operators and occupants, vehicle manufacturers and their suppliers are increasingly designing and manufacturing vehicles with additional and improved vehicle stability management (VSM) features. One such feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems include vehicle wheel speed sensors for providing inputs to an anti-lock brake system control unit. The control unit controls anti-lock brake system control valves interposed between the brake master cylinder and the individual wheel brakes of a hydraulic brake circuit. Such control valves include isolation valves and dump valves. The control valves, in turn, regulate or modulatel hydraulic brake fluid pressure in the individual wheel brakes to implement anti-lock braking and/or dynamic rear proportioning. One or more ABS pumps pump the fluid from one or more low pressure accumulators (LPA) to the control valves or back to the master cylinder.

In operation, one or more of the vehicle wheel speed sensors not only senses the vehicle wheel speed, but also provides input to the control unit for determining the vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

Next, the control unit compares the vehicle wheel velocity to the vehicle velocity to determine a departure depth. Again, using the vehicle velocity as a reference, departure depth may be expressed as the difference between the vehicle velocity and the wheel velocity. During normal vehicle braking, the wheel velocity closely matches the vehicle velocity. Thus, during normal vehicle braking, the difference between the vehicle velocity and the wheel velocity is nominal.

However, during an anti-lock braking event, the wheel velocity decreases significantly below, or "departs" from, the vehicle reference velocity. This is called "departure". In such a situation, as for example during hard braking on an ice covered road, the frictional force between the vehicle brake pads and the vehicle wheel exceeds that between the vehicle wheel and the road surface. Uncontrolled, such a frictional force differential causes the vehicle wheel to cease rotating, or to "lock".

In turn, locking causes the vehicle wheels to slip or "skid", rather than roll, over the road surface. Such vehicle wheel skidding dramatically reduces traction and the ability of the vehicle operator to bring the vehicle to a controlled stop.

To prevent such vehicle wheel lock and the accompanying problems, the control unit of an anti-lock brake system activates the anti-lock brake system isolation valves to regulate hydraulic brake fluid pressure in the individual wheel brakes during an anti-lock braking event. Typically, there is both a wheel slip and wheel deceleration criterion required for the activation of the isolation valves. More specifically, the control unit compares the departure depth to the slip threshold and actuates the isolation valves when the departure depth exceeds the slip threshold in order to isolate the individual vehicle wheel brakes in the hydraulic brake circuit from the master cylinder, thereby halting any increase in brake fluid pressure in the vehicle wheel brakes and preventing incipient vehicle wheel lock.

More particularly, when, during vehicle braking, the departure depth exceeds the slip threshold, each isolation valve isolates brake fluid in its individual wheel brake from the increasing brake fluid pressure in the master cylinder in order to hold brake fluid pressure in the wheel brake constant. If the isolated brake fluid pressure in the wheel brake is still high enough to cause incipient wheel lock, the anti-lock brake system then bleeds, or dumps, brake fluid from the wheel brake through its dump valve to reduce brake fluid pressure therein. The dumped brake fluid then flows back to the accumulator.

Thereafter, the anti-lock brake system typically holds brake fluid pressure in the wheel brake constant until such time as the departure depth no longer exceeds the slip threshold, indicating that the vehicle wheel is again traveling at or near the velocity of the vehicle. At that time, the anti-lock brake system then increases, or builds, brake fluid thereto. Reapplication of brake fluid to the wheel brake may be at a steep or gradual rate, or some combination thereof, depending upon the circumstances or the control desired.

To maintain smooth braking and optimum vehicle control, some reapplication of brake fluid to the wheel brakes must be undertaken where the isolation of the brake fluid in the wheel brakes from that in the master cylinder has been prolonged, for example on the order of one hundred milliseconds or greater. Such reapplication must be undertaken in order to raise brake fluid pressure in the wheel brake to a level approximately that in the master cylinder before the isolation valve may desolate the wheel brake back to master cylinder pressure.

Most ABS systems use a motor-driven pump to move or pump brake fluid from a low-pressure storage source or area (i.e. accumulator) to a high-pressure source (i.e. main brake line). In this way, pressure can be increased in the brakes, allowing modulation of brake pressure to control brake torque.

Current technology for ABS systems typically turns the pump motor fully "on" anytime there is a recognized need to move fluid from the low pressure storage area. The pump motor and the action of pumping fluid within the hydraulic system is a recognized source of audible noise in an ABS system especially when the load on the pump is relatively low and when the pump is to be "on" only a short period of time (i.e., the pump is to be turned "off" at essentially the time the pump has achieved its maximum operating speed).

Minimization of system NVH is a goal of many ABS systems. For example, one approach taken by the prior art to minimize system noise is to provide a closed-loop motor control system for the pump as illustrated in U.S. Pat. No. 4,892,364. However, this requires the added cost of a sensor.

Another approach known by the prior art is to measure the voltage generated by the pump motor to control the pump motor as illustrated in WO 94/07717. However, this approach also requires a feedback signal and control logic to process the feedback signal.

SUMMARY OF THE INVENTION

An object of the present invention is to provide an open-loop method and system which activate electro-hydraulic control but do not turn its pump on until certain fluid displacement criteria are met to minimize system NVH.

In carrying out the above objects and other objects of the present invention, a method is provided for controllably restricting the on time of a pump of an electro-hydraulic control system for a hydraulic brake system including a low pressure accumulator (LPA). The electro-hydraulic control system including means for varying the amount of hydraulic brake fluid in the LPA. Both systems are mounted on a vehicle having front and rear wheels. The pump has an on state and an off state. The method includes the steps of: sensing wheel speed for at least one of the wheels; detecting an electrohydraulic control event based on the sensed wheel speed; and activating the means for varying based on the detected control event. The method also includes the steps of: modeling the amount of brake fluid in the LPA during the step of activating and controlling the state of the pump based on the modeled amount of brake fluid in the LPA.

Preferably, the means for varying includes a dump valve for each of the wheels and wherein during the step of activating the dump valves are activated so that the dump valves dump brake fluid to the LPA.

Also, preferably, the step of modeling includes the step of determining the amount of brake fluid dumped to the LPA by all of the dump valves.

Still further in carrying out the above objects and other objects of the present invention, a system is provided for controllably restricting the on time of a pump in an electro-hydraulic control system for a hydraulic brake system including a low pressure accumulator (LPA). Both systems are mounted on a vehicle having front and rear wheels. The pump has an on state and an off state and is fluidly coupled to the LPA to pump brake fluid therefrom. The electro-hydraulic control system includes: at least one sensor for sensing wheel speed of at least one wheel; and means for varying an amount of brake fluid in the LPA. The electro-hydraulic control system also includes a control unit coupled to the at least one sensor and the means for varying for: detecting an electro-hydraulic control event based on the sensed wheel speed; activating the means for varying based on the detected control event; modeling the amount of hydraulic brake fluid in the LPA during activation of the means for varying; and controlling the state of the pump based on the modeled amount of brake fluid in the LPA.

Preferably, the means for varying includes a dump valve fluidly coupled to the LPA for each of the wheels wherein the control unit activates the dump valves so that the dump valves dump brake fluid to the LPA. Also preferably, the control unit models the amount of brake fluid dumped to the LPA by all of the dump valves.

Advantages accruing to the method and system of the present invention are numerous. For example, the method and system provide an open loop electro-hydraulic control which does not turn the pump on when a modeled amount of hydraulic fluid is low and does not turn the pump on until certain modeled fluid displacement criteria are met to minimize system NVH.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
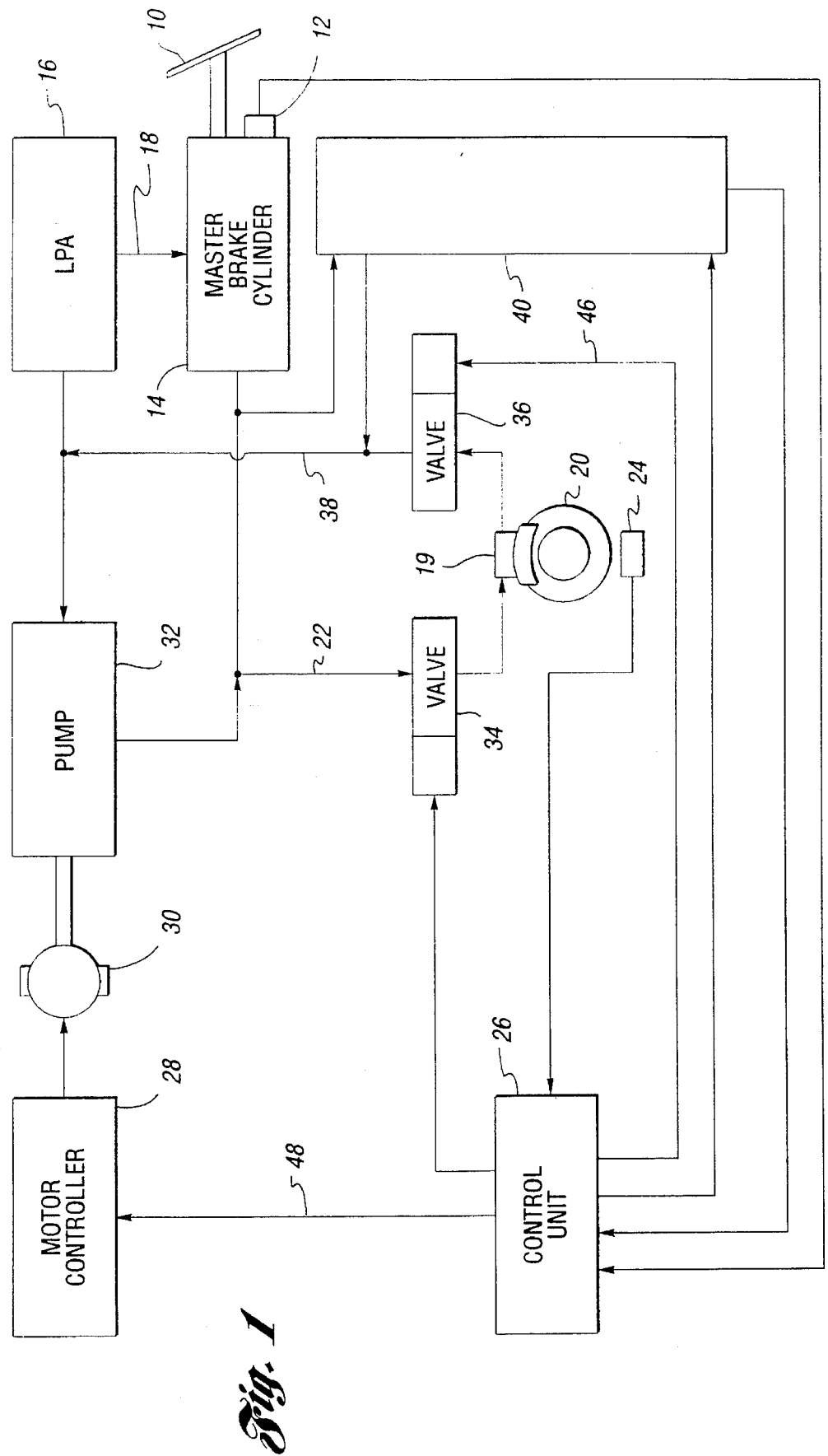
FIG. 1 is a schematic block diagram illustrating a hydraulic brake system and an electro-hydraulic control system for controlling the hydraulic brake system.

Referring to FIG. 1, there is illustrated a brake pedal 10, a brake switch 12 and a master brake cylinder 14 of a hydraulic brake system of a motor vehicle. The brake system also includes a low pressure accumulator (LPA) 16 fluidly coupled to the master brake cylinder along a line 18. A brake 19 of a wheel 20 of the vehicle is also fluidly coupled to the master brake cylinder 14 along by a main brake line 22.

An electro-hydraulic control system, such as a vehicle ABS, includes a wheel speed sensor input circuit 24 for sensing the velocity of the wheel 20 whereupon the output of the wheel speed circuit 24 is fed or coupled to a control unit 26. Such operative connections are preferably electrical, but may also be other types of connections such as fiberoptic.

Preferably, the wheel speed circuit 24 includes a stationary, variable, reluctance sensor positioned adjacent a toothed wheel, which rotates with its respective vehicle wheel 20. Each sensor provides a series of analogue pulses. The frequency of the analogue pulses is proportional to the angular speed or velocity for its corresponding wheel. The analogue output of each sensor is converted into a digital pulse train whose frequency varies directly with the speed of its respective wheel 20. Other well-known wheel speed sensor configurations may also be employed.

Typically, the control unit 26 includes a commercially available microcontroller which, once programmed, functions as a control means or mechanism for activating the ABS.

The electro-hydraulic control system also includes a motor controller 28 which, in turn, is electrically coupled to an electric drive motor 30 which drives a hydraulic brake fluid pump 32. The pump 32 pumps fluid from the low pressure accumulator 16 into the main brake line 32 and generally serves as an auxiliary source of hydraulic brake fluid, as is well known in the art.

The electro-hydraulic control system also includes control valves including a solenoid-operated isolation valve 34 and a solenoid-operated dump valve 36 which, when controlled by the control unit 26, modulates and controls the amount of brake fluid applied to the brake 19 of the wheel 20. The dump valve 36 dumps hydraulic brake fluid along a return line 38 to the low pressure accumulator 16.

For purposes of simplifying the drawing figure, block 40 represents the remaining control valves, brakes, wheels, and wheel speed input circuits which are mounted on the vehicle.

Figure 2:
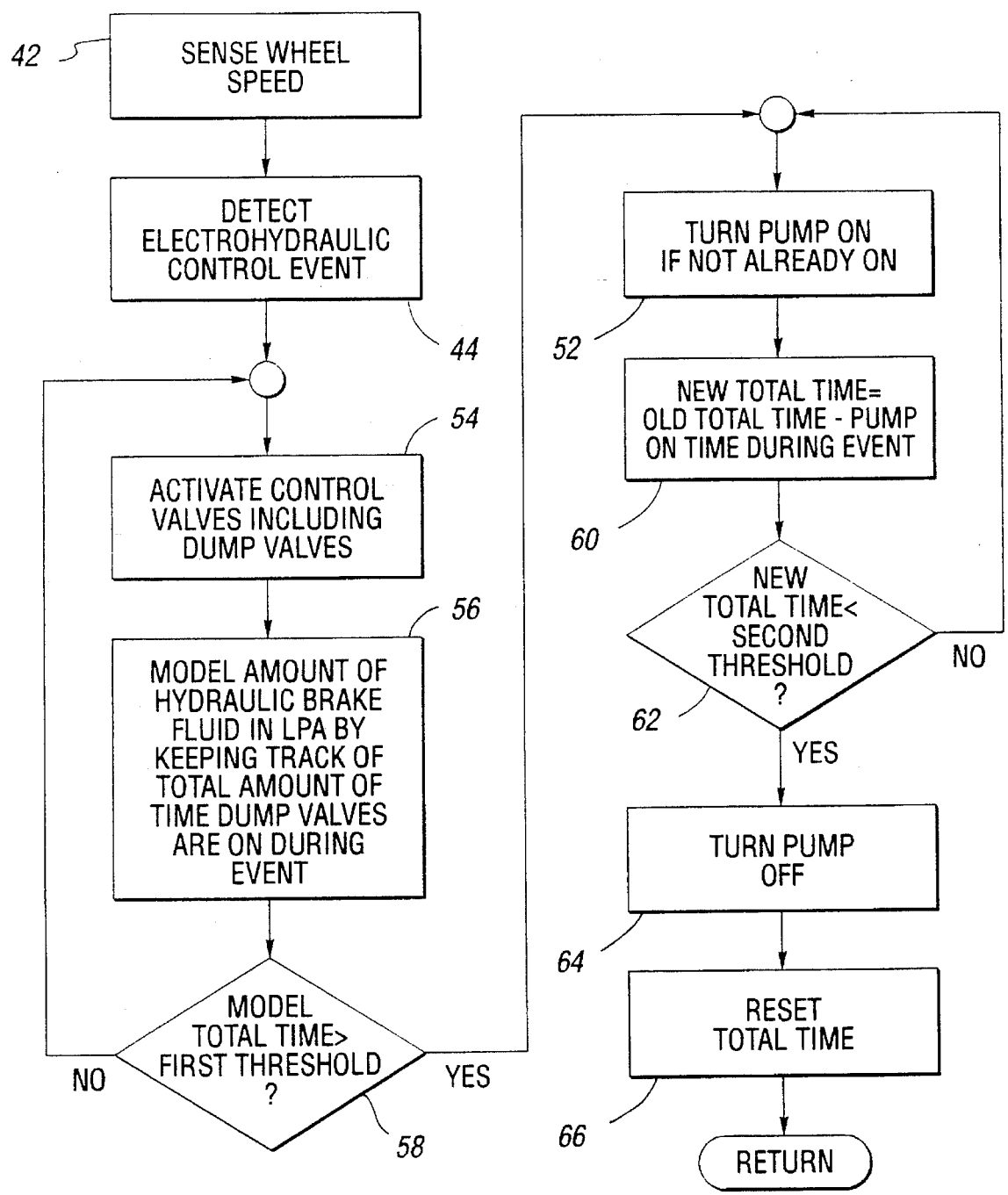
FIG. 2 is a block diagram flow chart illustrating control logic for the steps taken by the electro-hydraulic control system of the present invention.

Referring now to FIG. 2, there is illustrated in block diagram flow-chart form the control logic for carrying out the method and system of the present invention. At block 42, the speed of each of the wheels is sensed and an input signal is input into the control unit 26 for each of the wheels, only one of which is shown at 20 in FIG. 1.

At block 44, an electro-hydraulic control event, such as an ABS event, is detected based upon the sensed wheel speed from one or more of the wheel speed circuits 24. Typically, even a relatively small departure, such as one caused by a bump, may cause an elec- tro-hydraulic control event to be detected as is well known to those of ordinary skill in the art. Such an ABS event may be of a duration as little as 80 milliseconds. Typically, when such a control event is detected, such as at block 44, brake pressure is reduced wherein the control unit 26 provides one or more dump pulses on line 46 to the dump valve 36 of FIG. 1 (and possibly to the other dump valves of block 40). The solenoid-operated dump valve 36 causes brake fluid to flow back through the return line 38 to the low pressure accumulator (LPA) 16.

In the prior art, typically the control unit 26 causes the pump 32 to turn on by generating an electrical control signal on a line 48 of FIG. 1, which, in turn, is received by the motor controller 28. The motor controller 28 in turn, controls the motor 30 which drives the pump 32 during such a short-duration ABS event. However, when the pump 32 is turned on during such a short duration ABS event, there is typically little fluid in the low pressure accumulator 16 for the pump 32 to pump. This results in the pump 32 operating under a low load condition which causes the pump 32 to emit an audible noise (i.e., generates an NVH problem).

The method and system of the present invention are provided to overcome this problem.

At block 54, the control valves including the dump valve 36 is activated.

At block 56, the control unit 26 monitors the amount of hydraulic brake fluid which is in the low pressure accumulator 16 by keeping track of the total amount of time the dump valves 36 are on or open during the control event. This is done by the control unit 26 keeping track for each individual dump valve 36, the pulse width of all of the dump pulses appearing on line 46 after the detection of an electro-hydraulic control event. Preferably, the pulse width is loaded into a hardware timer of the control unit 26 and the dump valve 36 is energized until the timer expires. In like fashion, isolation valve control is accomplished wherein a pulse width is loaded into another hardware timer and the isolation valve 34 is de-energized. The isolation valve 34 is de-energized until the timer expires. These pulse widths are added together for each dump valve 36. The sum of these pulse widths are proportional to the amount of brake fluid dumped by a particular dump valve 36 back along the return line 38 to the low pressure accumulator 16. Typically, there is a linear relationship between the total dump on time and the amount of brake fluid going to the low pressure accumulator 16 via the return line 38.

At block 58, the model total time is compared with a first threshold and as long as the model total time is less than the first threshold the pump is not turned on. The first threshold represents the minimum amount of brake fluid which should be in the low pressure sure accumulator 16 before the pump 32 is turned on.

When the model total time, however, becomes greater than the first threshold, the pump is turned on at block 52.

At block 60, a new total time is computed as being equal to the old total time minus the amount of pump on time during the control event. In other words, the new total time is equal to the old total time minus the amount of time that the pump is on which is directly proportional to the amount of hydraulic brake fluid being drawn from the low pressure accumulator 16 by the pump 32. In this way, the control unit 26 keeps track of or models, the amount of hydraulic brake fluid in the low pressure accumulator 16.

At block 62, the new total time is compared with a second threshold which is less than the first threshold. As long as the new total time is greater than the second threshold, the pump 32 stays on (i.e. block 52) and a new total time is again computed at block 60.

If the new total time, however, is less than the second threshold, the pump 32 is turned off at block 64. When the new total time is less than the second threshold, this indicates that modeled amount of hydraulic brake fluid in the low pressure accumulator 16 has fallen below a second predetermined amount which will cause the pump to again experience a low load condition and result in unacceptable audible noise. Consequently, the pump is turned off at block 64.

At block 66, the total model time is re-set within the control unit 26 in preparation for another electro-hydraulic control event, such as an ABS event.

The first threshold is larger than the second threshold to provide a dead-band or hysteresis effect wherein the pump 32 is turned on only when the modeled time reaches the higher first threshold and is only turned off after it reaches the lower second threshold.

Typically, brake fluid 16 in the LPA drips back into the master brake cylinder 14 in order to return hydraulic brake fluid to the master brake cylinder 14.

Preferably, the turn-off criteria of block 62 overrides the turn-on criteria of block 58. Its effect is to make the pump run time roughly proportional to the global dump time.

While the best mode for carrying out the invention has been described in detail, those familiar with the art to which this invention relates will recognize various alternative designs and embodiments for practicing the invention as defined by the following claims.

What is claimed is:

1. An open-loop method for controllably restricting the on time of a pump of an electro-hydraulic control system for a hydraulic brake system including a low pressure accumulator (LPA), the electro-hydraulic control system including means for varying an amount of brake fluid in the LPA, both systems being mounted on a vehicle having front and rear wheels, the pump having an on state and an off state and being fluidly coupled to the LPA to pump brake fluid therefrom, the method comprising the steps of:

sensing wheel speed for at least one of the wheels;

detecting an electro-hydraulic control event based on the sensed wheel speed;

activating the means for varying based upon the detected control event;

modeling the amount of brake fluid in the LPA during the step of activating, the step of modeling including the step of estimating the amount of brake fluid in the LPA at a number of times during the step of activating; and controlling the state of the pump based on the modeled amount of brake fluid in the LPA.

2. The method of claim 1 wherein the means for varying includes a dump valve for each of the wheels fluidly coupled to the LPA and wherein during the step of activating the dump valves are activated so that the dump valves dump brake fluid to the LPA and wherein the step of modeling includes the step of determining the amount of brake fluid dumped to the LPA by all of the dump valves.

3. The method of claim 2 wherein each of the dump valves has an open state to allow the dumping of fluid and a closed state to prevent the dumping of fluid wherein the step of determining includes the step of accumulating the amount of time the dump valves are in their open state.

4. The method of claim 2 wherein the means for varying includes the pump and wherein the step of modeling includes the step of determining an amount of brake fluid pumped from the LPA by the pump.

5. The method of claim 4 wherein the step of determining the amount of brake fluid pumped from the LPA by the pump includes the step of determining the amount of time the pump is in its on state.

6. The method of claim 1 wherein the step of controlling includes the step of comparing the modeled amount of brake fluid to a first predetermined quantity and if the modeled amount is greater than the first predetermined quantity, turning on the pump.

7. The method of claim 6 wherein the means for varying includes the pump and wherein the step of modeling includes the step of determining an amount of brake fluid pumped from the LPA by the pump.

8. The method of claim 7 wherein the step of determining the amount of brake fluid pumped from the LPA by the pump includes the step of determining the amount of time the pump is in its on state.

9. The method of claim 6 wherein the step of controlling includes the step of comparing the modeled amount of brake fluid to a second predetermined quantity less than the first predetermined quantity and, if the modeled amount is less than the second predetermined quantity, turning off the pump.

10. The method of claim 1 further comprising the step of deactivating the means for varying based on the sensed wheel speed and wherein the step of modeling includes the step of re-setting the modeled amount of brake fluid in the LPA to substantially zero after the step of deactivating.

11. An open-loop system for controllably restricting the on time of a pump in an electro-hydraulic control system for a hydraulic brake system including a low pressure accumulator (LPA), both systems being mounted on a vehicle having front and rear wheels, the pump having an on state and an off state and being fluidly coupled to the LPA to pump brake fluid therefrom, the electrohydraulic control system comprising:

at least one sensor for sensing wheel speed of at least one wheel;

means for varying an amount of brake fluid in the LPA; and a control unit coupled to the at least one sensor and the means for varying for:

detecting an electro-hydraulic control event based upon the sensed wheel speed;

activating the means for varying based on the detected control event;

modeling the amount of brake fluid during activation of the means for varying by estimating the amount of brake fluid in the LPA at a number of times during the activation; and controlling the state of the pump based on the modeled amount of brake fluid in the LPA.

12. The system of claim 11 wherein the means for varying include a dump valve for each of the wheels fluidly coupled to the LPA wherein the control unit activates the dump valves so that the dump valves dump brake fluid to the LPA and wherein the control unit models the amount of brake fluid dumped to the LPA by all of the dump valves.

13. The system of claim 12 wherein each of the dump valves has an open state to allow the dumping of brake fluid and a closed stated to prevent dumping of the brake fluid and wherein the control unit accumulates the amount of time the dump valves are in their open state.

14. The system of claim 12 wherein the means for varying includes the pump and wherein the control unit determines an amount of brake fluid pumped from the LPA by the pump.

15. The system of claim 14 wherein the control unit determines the amount of brake fluid pumped from the LPA by the pump by determining the amount of time the pump is in its on state.

16. The system of claim 11 wherein the control unit compares the modeled amount of brake fluid to a first predetermined quantity and, if the modeled amount is greater than the first predetermined quantity, the control unit turns on the pump.

17. The system of claim 16 wherein the means for varying includes the pump and wherein the control unit determines the amount of brake fluid pumped from the LPA by the pump.

18. The system of claim 17 wherein the control unit determines the amount of brake fluid pumped from the LPA by the pump by determining the amount of time that the pump is in its on state.

19. The system of claim 16 wherein the control unit compares the modeled amount of brake fluid to a second predetermined quantity less than the first predetermined quantity and, if the modeled amount is less than the second predetermined quantity, the control unit turns off the pump.

20. The system of claim 11 wherein the control unit deactivates the means for varying based upon the sensed wheel speed and wherein the control unit sets the modeled amount of brake fluid in the LPA to substantially zero after deactivating the means for varying.

* * * * *